US008130870B2

(12) United States Patent
Lakkis

(10) Patent No.: US 8,130,870 B2
(45) Date of Patent: Mar. 6, 2012

(54) UWB SYSTEM EMPLOYING GAUSSIAN MINIMUM SHIFT KEY MODULATION, COMMON MODE SIGNALING AND BEAMFORMING

(75) Inventor: Ismail Lakkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 721 days.

(21) Appl. No.: 12/185,500

(22) Filed: Aug. 4, 2008

(65) Prior Publication Data

US 2009/0041156 A1    Feb. 12, 2009

Related U.S. Application Data

(60) Provisional application No. 60/963,596, filed on Aug. 6, 2007, provisional application No. 60/963,838, filed on Aug. 7, 2007.

(51) Int. Cl.
*H03C 3/00* (2006.01)

(52) U.S. Cl. ........................................ 375/302

(58) Field of Classification Search ............. 375/302, 375/260, 298, 239
See application file for complete search history.

(56) References Cited

U.S. PATENT DOCUMENTS

| | | | | |
|---|---|---|---|---|
| 5,519,732 A * | 5/1996 | Chester | ........................... | 375/295 |
| 6,298,097 B1 * | 10/2001 | Shalom | ........................... | 375/297 |
| 7,924,937 B2 * | 4/2011 | Norsworthy et al. | ......... | 375/295 |
| 7,929,618 B2 * | 4/2011 | Voloshin et al. | .............. | 375/259 |
| 2002/0118834 A1 * | 8/2002 | Wilson et al. | ................. | 380/222 |

OTHER PUBLICATIONS

IEEE 802.15.3, "Part 15.3: Wireless Medium Access Control (MAC) and Physical Layer (PHY) Specifications for High Rate Wireless Personal Area Networks (WPANs)," IEEE, Sep. 2003.
IEEE 802.15.3b, "Part 15.3: Wireless Medium Access Control (MAC) and Physical Layer (PHY) Specifications for High Rate Wireless Personal Area Networks (WPANs), Amendment 1: MAC Sublayer," IEEE, May 2006.
IEEE P802.15.3.c/D00, "Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension" LAN/MAN Standards Committee of the IEEE Computer Society, IEEE Standards Draft.
I. Lakkis et al., "A Simple Coherent GMSK Demodulator", IEEE PIMRC 2001.

* cited by examiner

*Primary Examiner* — Kevin Kim
(74) *Attorney, Agent, or Firm* — Dang M. Vo

(57) ABSTRACT

A multi-mode transmission system supporting OFDM and single-carrier signals is configured to perform interpolation and decimation such that the ratio of the interpolation factor to the decimation factor equals the ratio between the OFDM sampling rate and the single-carrier chip rate. A constant-envelope modulator comprises a π/4 fixed rotator, a π/2 continuous rotator, and in-phase and quadrature-phase analog Bessel filters. Frame formats and signaling protocols are provided for signal acquisition, synchronization, and tracking between wireless devices that employ different antenna configurations. Spreading gains are selected to compensate for different antenna gains such that the total gain (antenna gain plus spreading gain) is substantially equal for transmissions employing different beam patterns.

17 Claims, 14 Drawing Sheets

| Channel Number | Low Freq. (GHz) | Center Freq. | High Freq. (GHz) | 3 dB BW (MHz) | Roll-Off Factor |
|---|---|---|---|---|---|
| 1 | 57.240 | 58.320 | 59.400 | 1728 | 0.25 |
| 2 | 59.400 | 60.480 | 61.560 | 1728 | 0.25 |
| 3 | 61.560 | 62.640 | 63.720 | 1728 | 0.25 |
| 4 | 63.720 | 64.800 | 65.880 | 1728 | 0.25 |

UWB SYSTEM EMPLOYING GAUSSIAN MINIMUM SHIFT KEY MODULATION, COMMON MODE SIGNALING AND BEAMFORMING

CROSS-REFERENCE TO RELATED APPLICATIONS

This application claims priority under 35 U.S.C. 119(e) to U.S. Provisional Application Ser. No. 60/963,596, filed Aug. 6, 2007, and U.S. Provisional Application Ser. No. 60/963,838, filed Aug. 7, 2007, both of which are incorporated herein by reference.

BACKGROUND OF THE INVENTION

I. Field of the Invention

This invention relates generally to wireless communication systems and more particularly to physical-layer signal processing in a millimeter-wave wireless communication system.

II. Description of the Related Art

In one aspect of the related art, a dual-mode ultra-wideband (UWB) Physical Layer supporting single carrier and OFDM modulation employs a common mode. The UWB Physical Layer may be used for millimeter wave (e.g., 60 GHz) communications. Specifically, the document IEEE P802.15.3.c/D00, "Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," is incorporated herein by reference in its entirety.

The common mode is a single-carrier mode used by both single-carrier and OFDM devices for beaconing, network-control signaling, and base-rate data communications. The common mode is typically necessary for interoperability between different devices and different networks.

For low-power devices, it is advantageous for the common mode to employ a continuous phase modulated (CPM) signal having a constant envelope so that power amplifiers can be operated at maximum output power without affecting the spectrum of the filtered signal. Gaussian minimum shift keying (GMSK) is a form of continuous phase modulation having compact spectral occupancy by choosing a suitable bandwidth time product (BT) parameter in a Gaussian filter. The constant envelope makes GMSK compatible with nonlinear power amplifier operation without the concomitant spectral re-growth associated with non-constant envelope signals.

Various techniques may be implemented to produce GMSK pulse shapes. For example, $\pi/2$-binary phase shift key (BPSK) modulation (or $\pi/2$-differential BPSK) with a linearized GMSK pulse may be implemented, such as shown in I. Lakkis, J. Su, & S. Kato, "A Simple Coherent GMSK Demodulator", IEEE PIMRC 2001, which is incorporated by reference herein.

SUMMARY OF THE INVENTION

Embodiments disclosed herein are advantageous for systems employing single-carrier and OFDM signals used in 60 GHz millimeter wave systems, such as defined by the IEEE802.15.3c protocol. However, the invention is not intended to be limited to such systems, as other applications may benefit from similar advantages.

In multi-mode communication systems supporting both multicarrier and single-carrier transmissions, the multicarrier sampling rate often differs from the single-carrier chip rate. In accordance with one embodiment of the invention, a multi-mode transmission system supporting OFDM and single-carrier signals is configured to perform interpolation and decimation such that the ratio of the interpolation factor to the decimation factor equals the ratio between the OFDM sampling rate and the single-carrier chip rate. Specifically, a multi-mode transmission system comprises an interpolation means, a rotation means, a pulse-shaping means, and a decimation means.

The interpolation means is configured for interpolating a data stream with respect to a predetermined factor N to generated interpolated data. The interpolation means may comprise, by way of example, but without limitation, a linear interpolator, a polynomial interpolator, a spline interpolator, a piecewise-constant interpolator, or a trigonometric interpolator. Alternative interpolators may be employed. The interpolation means may comprise any combination of hardware and software configured for executing an interpolation algorithm on an input data stream.

The rotation means may comprise, by way of example, but without limitation, a $\pi/2$ continuous rotator. The pulse-shaping means may comprise, by way of example, but without limitation, a pulse-shaping filter. The combination of the rotation means and the pulse-shaping means are configured for producing a constant-envelope modulated signal from the interpolated data. The rotation means may comprise any combination of hardware and software configured for executing a $\pi/2$ continuous rotation. The pulse-shaping means may comprise any combination of hardware and software configured for executing a pulse-shaping algorithm.

The decimation means may comprise, by way of example, but without limitation, a decimator, such as a low-pass anti-aliasing filter configured with a down-sampler. The decimation means is configured for decimating the modulated signal by a factor of M. The decimation means may comprise any combination of hardware and software configured for executing a decimation algorithm. The resulting decimated waveform produced by the multi-mode transmission system has a sampling rate of N/M.

In another embodiment of the invention, a modulation system comprises a rotation means and a Bessel filtering means. The rotation means may comprise, by way of example, but without limitation, a $\pi/4$ fixed rotator and a $\pi/2$ continuous rotator configured for processing an input data signal to produce a complex signal comprising real and imaginary binary parts. The rotation means may comprise any combination of hardware and software configured for executing a $\pi/4$ fixed rotation and a $\pi/2$ continuous rotation.

The Bessel filtering means may comprise, by way of example, but without limitation, an in-phase analog Bessel filter and a quadrature-phase analog Bessel filter configured for operating on the complex signal to produce a constant-amplitude output signal. The Bessel filtering means may comprise alternative filter types, including other linear filters characterized by flat group delay. The Bessel filtering means may comprise any combination of hardware and software configured for executing an in-phase Bessel filter function and a quadrature-phase Bessel filter function.

In another embodiment of the invention, both pico-net controllers (PNCs) and subscriber devices may comprise a variety of antenna configurations, including phased antenna arrays, sectored antennas, and omni-directional antennas. Transmission-frame formats and transmission methods in accordance with embodiments of the invention enable subscriber devices with different antenna configurations to be able to discover, synchronize, and track a PNC, which may have its own unique antenna capabilities.

In accordance with one embodiment of the invention, there is a method for equalizing total signal gain for control information that is transmitted from a plurality of different antenna configurations. In one aspect, a PNC comprises a quasi-omni beamforming means configured for producing a set of quasi-omni beams with complementary patterns that together provide omni-directional coverage. Each quasi-omni beam has at least a first antenna gain. The PNC further comprises a directional beamforming means configured for producing a set of directional beams, each directional beam having at least a second antenna gain, the at least second antenna gain being greater than the at least first antenna gain. The PNC further comprises a beacon-frame generation means configured for constructing a first beacon frame having a first spreading gain to be transmitted on each of the quasi-omni beams and a second beacon frame having a second spreading gain to be transmitted on each of the directional beams.

The beacon-frame generation means selects the first spreading gain and the second spreading gain such that the sum of the first spreading gain and the first antenna gain equals the sum of the second spreading gain and the second antenna gain. Typically, the beacon frames for the quasi-omni beams have a higher spreading gain than the beacon frames for the directional beams. The beacon-frame generation means may provide for higher spreading gain may by any combination of employing more repetitions of a signal segment, scrambling the signal segment in a variety of ways that are well known in the art, and using longer Golay codes in the signal segment(s).

In accordance with an embodiment of the invention, there is a method for determining a preferred set of beam patterns for transmitting information between a network controller and a subscriber device. A subscriber device is configured for detecting a quasi-omni signal transmitted with a quasi-omni beam pattern by a PNC. The subscriber device reads beacon-frame information in the quasi-omni signal and uses the beacon-frame information to assist in detecting directional signals transmitted by the PNC. The subscriber device calculates a link-quality factor for each combinations of beam pattern employed by the subscriber device and directional beam pattern employed by the network controller. The subscriber device then transmits a request to the PNC indicating a preferred directional beam pattern to use when communicating with the subscriber device.

Although particular embodiments are described herein, many variations and permutations of these embodiments fall within the scope and spirit of the invention. Although some benefits and advantages of the preferred embodiments are mentioned, the scope of the invention is not intended to be limited to particular benefits, uses, or objectives. Rather, embodiments of the invention are intended to be broadly applicable to different wireless technologies, system configurations, networks, and transmission protocols, some of which are illustrated by way of example in the figures and in the following description of the preferred embodiments. The detailed description and drawings are merely illustrative of the invention rather than limiting, the scope of the invention being defined by the appended claims and equivalents thereof.

BRIEF DESCRIPTION OF THE DRAWINGS

The above needs are at least partially met through provision of the method and apparatus for adaptive modulation of wireless communication signals described in the following detailed description, particularly when studied in conjunction with the drawings, wherein.

Figure 1:
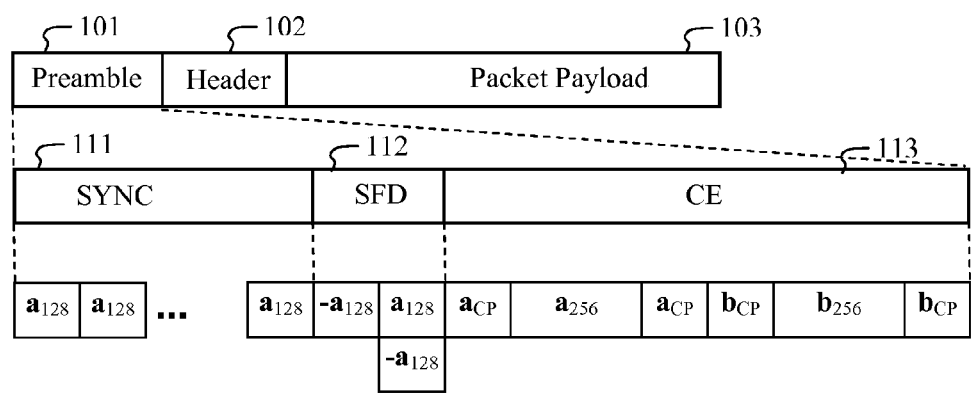
FIG. 1 is a representation of a frame structure for a common-mode communication signal in accordance with an embodiment of the invention.

Skilled artisans will appreciate that elements in the figures are illustrated for simplicity and clarity and to help to improve understanding of various embodiments of the present invention. Also, common but well-understood elements that are useful or necessary in a commercially feasible embodiment may not be depicted in order to facilitate a less obstructed view of these various embodiments of the present invention. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF PREFERRED EMBODIMENTS

Accordingly, while the embodiments of the present disclosure are susceptible to various modifications and alternative forms, specific exemplary embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers may refer to like elements throughout the description of the figures.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a representation of a frame structure for a common-mode communication signal in accordance with an embodiment of the invention. The common-mode signal comprises Golay spreading codes with chip-level $\pi/2$-DBPSK modulation and shortened Reed-Solomon (RS) coding, RS(255,239). Pulse shaping may employ GMSK or linearized GMSK. Alternatively, square-root raised cosine with clipping and/or lifting having a roll-off of 0.25, or square-root raised cosine without clipping, also having a roll-off of 0.25, may be employed.

A frame comprises a preamble 101, header 102, and packet payload 103. The preamble comprises a packet sync sequence field 111, a start-frame delimiter field 112, and a channel-estimation sequence field 113. The sync sequence 111 is a repetition of ones spread by length—128 complementary Golay codes $a^i_{128}$ and/or $b^i_{128}$. A long preamble may employ thirty codes, whereas a short preamble may employ as few as eight codes. The start-frame delimiter field 112 comprises an alternating sequence $\{1 -1\ 1 -1 \ldots\}$ spread by $a^i_{128}$ and/or $b^i_{128}$. The channel-estimation field 113 may be spread using length—256 complementary Golay codes $a^i_{256}$ and/or $b^i_{256}$, and may further comprise at least one cyclic prefix, such as $a^i_{CP}$ and $b^i_{CP}$, which are length—128 Golay codes. The header 102 and packet payload 103 may be binary or complex-valued and may be spread using length—64 complementary Golay codes $a^i_{64}$ and/or $b^i_{64}$.

Figure 2:
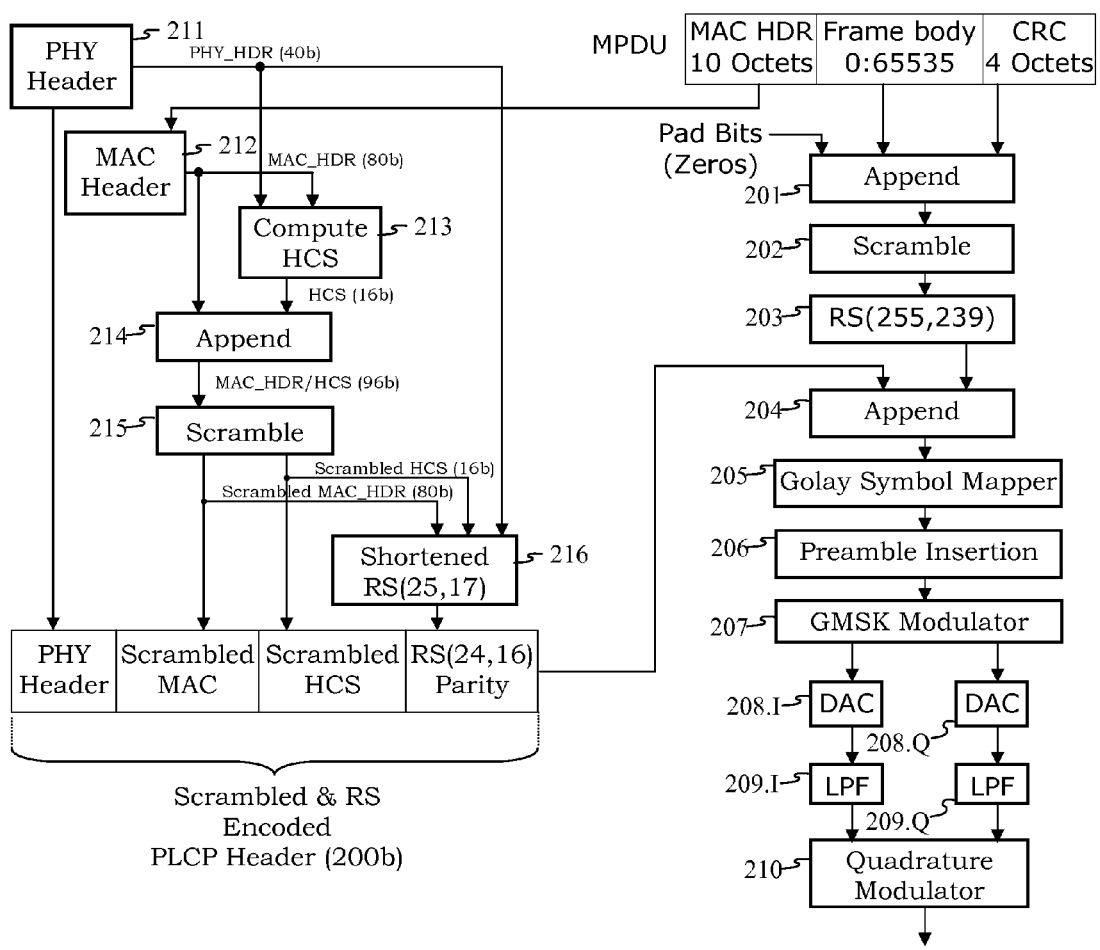
FIG. 2 is a block diagram of a transmitter as configured in accordance with one of various embodiments of the invention.

FIG. 2 is a block diagram of a transmitter as configured in accordance with one of various embodiments of the invention. Frame construction is provided by an Append block 201, a Scramble block 202, a Reed-Solomon coding block 203, an Append block 204, a Golay Symbol Mapping block 205, and a Preamble Insertion block 206. The frame header is constructed by a PHY Header block 211, a MAC Header block 212, an HCS Computation block 213, an Append block 214, a Scrambling block 215, and a Shortened Reed-Solomon coding block 216. Once the data is arranged in frames for transmission, it is processed by a GMSK modulator 207, which produces in-phase (I) and quadrature-phase (Q) signals, which are converted to analog signals in digital-to-analog converters (DACs) 208.I and 208.Q, filtered by low-pass filters (LPFs) 209.I and 209.Q, and modulated by a quadrature modulator 210.

Figure 3:
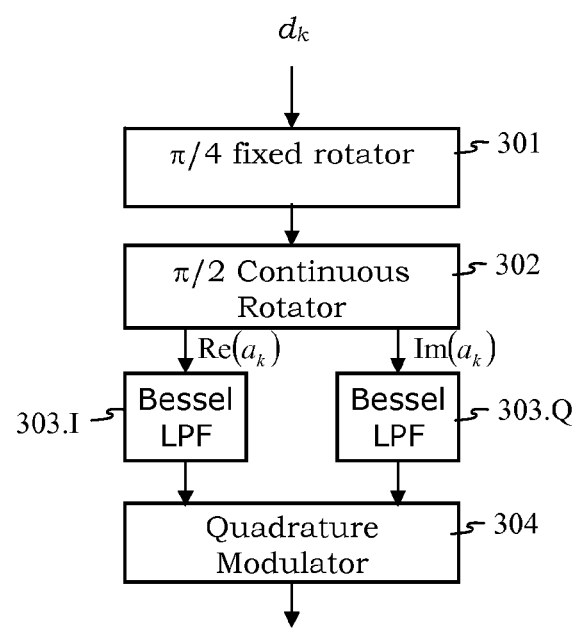
FIG. 3 is a block diagram of a modulator in accordance with an embodiment of the invention.

FIG. 3 is a block diagram of a modulator in accordance with an embodiment of the invention. It should be understood that the block diagram shown in FIG. 3 may be understood with respect to a variety of apparatus and method embodiments of the invention. Data $d_k$ in a frame is processed by a $\pi/4$ fixed rotator 301 and a $\pi/2$ continuous rotator 302 to produce a complex signal, $a_k = d_k \times (1+j) \times j^k$ $k=0,1,\ldots$, having real and imaginary parts. Since the real and imaginary parts of $a_k$ are binary signals, they do not require DACs. The real and imaginary parts are processed by analog Bessel filters 303.I and 303.Q, which provide a close approximation to linearized GMSK pulses. The analog Bessel filters 303.I and 303.Q produce a substantially constant-amplitude output signal having a low peak-to-average power (PAPR). For example, in some embodiments, a PAPR<0.2 dB may be produced.

Figure 4A:
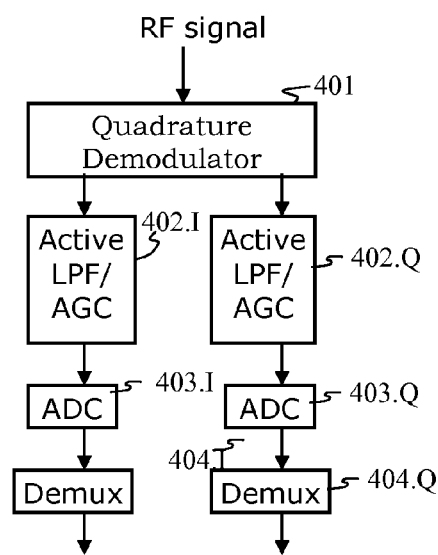
FIG. 4A is a block diagram of a prior-art demodulator, which may be employed by receivers in accordance with one aspect of the invention.

FIG. 4A is a block diagram of a prior-art demodulator, which may be employed by receivers in accordance with one aspect of the invention. For example, signals transmitted by the transmitter shown in FIG. 3 may be processed by conventional GMSK demodulators. A conventional quadrature demodulator 401 employs I and Q mixers (not shown), and is followed by a pair of low-pass filters with linear automatic gain controllers (AGCs) 402.I and 402.Q, a pair of high-speed, high-resolution analog-to-digital converters (ADCs) 403.I and 403.Q, and a pair of high-speed demultiplexers 404.I and 404.Q.

Figure 4B:
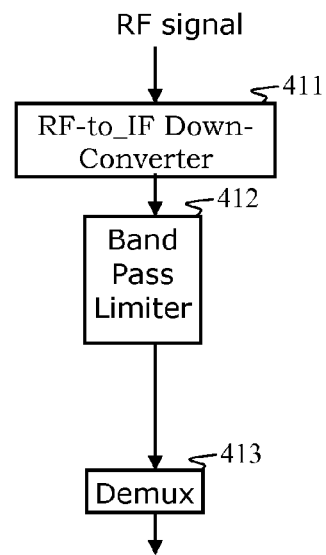
FIG. 4B is a block diagram of a demodulator as configured in accordance with an embodiment of the invention.

FIG. 4B is a block diagram of a demodulator as configured in accordance with an embodiment of the invention. This block diagram may be understood with respect to various apparatus and method embodiments of the invention. A down-converter 411 down-converts a received RF signal to an intermediate-frequency (IF) signal, which is processed by a band-pass limiter 412 and a demultiplexer 413. The down-converter 411 employs only one mixer and requires no AGC because the data is embedded in the sign of the RF signal (and thus, the IF signal), not its amplitude. Thus, a receiver amplifier (not shown) may be driven to saturation, allowing for low power consumption. In one embodiment of the invention, the band-pass limiter 412 may employ a 1-bit ADC embedded in its limiting function.

Figure 4C:
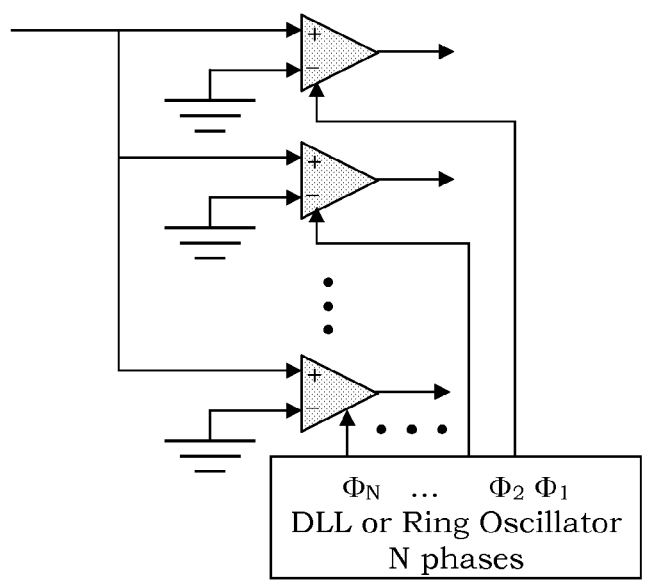
FIG. 4C is a block diagram of a limiter amplifier in accordance with an embodiment of the invention.

FIG. 4C is a block diagram of a limiter amplifier employing a 1-bit ADC, and a demultiplexer, which may comprise a DLL or ring oscillator with multi-phases and a bank of low-speed clocked comparators. Since the output is already parallelized, this design avoids high-speed demultiplexing.

As described with respect to common mode signaling, it is sometimes useful to transmit a single-carrier signal in a multi-carrier system. In one aspect of the related art, a Physical Layer supporting single carrier and OFDM modulation uses a common mode. In general, the single-carrier signal may comprise a predetermined set of parameters and may be generated using various techniques, e.g., a spread spectrum technique. Accordingly, there is a need in the art for techniques to efficiently process both single-carrier and multi-carrier signals for transmission and reception. However, in some cases, the OFDM sampling rate may differ from the single-carrier chipping rate.

Figures 5A, 5B:
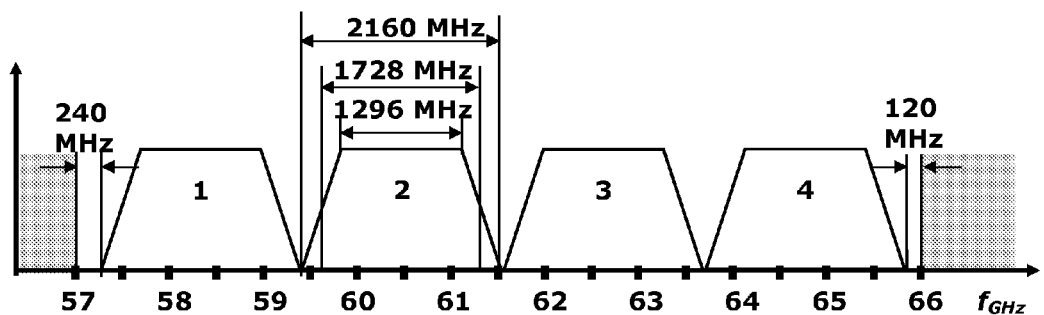
FIG. 5A is a table of channel frequency parameters for a proposed microwave channelization scheme.
FIG. 5B depicts the frequency spectrum of the channels in accordance with the channel parameters shown in the table of FIG. 5A.

FIG. 5A is a table of channel frequency parameters for a proposed microwave channelization scheme. FIG. 5B depicts the frequency spectrum of the channels in accordance with the channel parameters shown in the table of FIG. 5A. The channel parameters may be implemented by employing various crystal oscillators, including (but not limited to) 15 MHz, 18 MHz, 19.2 MHz, and 24 MHz crystal oscillators. This channel design supports multiple phase-locked loop (PLL) architectures, such as direct conversion, double conversion, and fixed IF.

In one embodiment of the invention, the sampling rate of an OFDM transceiver is set to 1.5 times the single-carrier (common mode) chip rate. For example, if the single-carrier chip rate is set to 1728 MHz, which corresponds to the 3 dB bandwidth of the channel separation of 2160 MHz, then the OFDM sampling rate is 2592 MHz. If the OFDM mode employs 512 subcarriers, 154 of the subcarriers may be assigned as guard subcarriers (77 on each side), and 354 data-bearing carriers, which occupy approximately 1728 MHz, which is the bandwidth of the single carrier.

Figure 6:
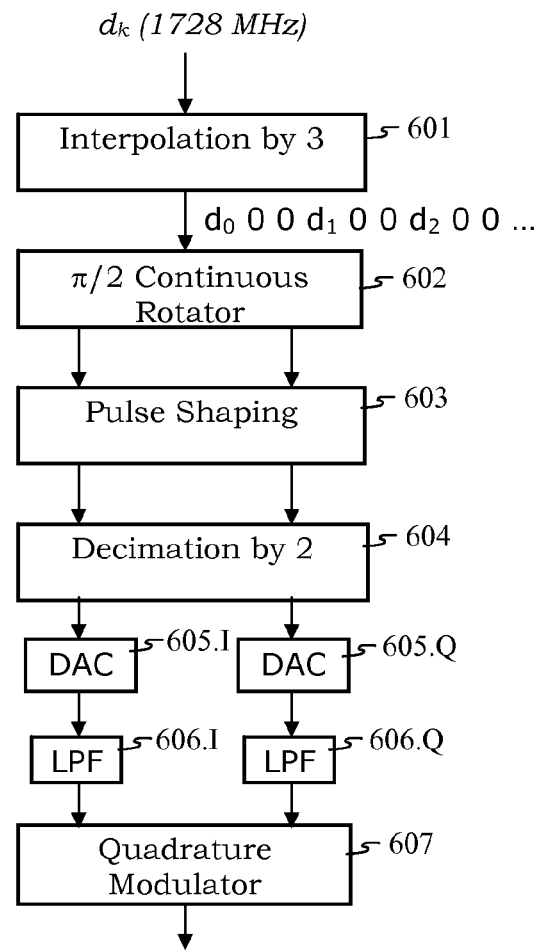
FIG. 6 is a block diagram of OFDM transmitter components configured to support common-mode signaling by interpolating a data stream by a factor of 3, followed by decimation employing a factor of 2.

FIG. 6 is a block diagram of OFDM transmitter components configured to support common-mode signaling by interpolating a data stream with respect to an interpolation factor of 3, followed by performing decimation with respect to a decimation factor of 2. An interpolator 601 interpolates spread data $d_k$ having a chip rate of 1728 MHz by the interpolation factor of 3. A $\pi/2$ continuous rotator 602 and a pulse-shaping filter 603 are configured to produce a constant-envelope modulated signal from the interpolated data. Any type of GMSK modulator or $\pi/2$-BPSK modulator may be used to perform modulation. A decimator 604 is configured to decimate the modulated signal by the decimation factor of 2. The resulting decimated waveform has a sampling rate of 1728 MHz×1.5=2592 MHz.

In some embodiments of the invention, the order of the interpolator 601 and the $\pi/2$ continuous rotator 602 may be switched. It should be appreciated that in different embodiments of the invention, the order in which linear operations are performed may be changed. Furthermore, the combination of interpolation, rotation, and pulse shaping may be implemented using polyphase decomposition. Thus, an alternative receiver design, such as a polyphase filter implementing a rate conversion by a factor of 1.5, may perform the function shown in FIG. 6. In practical implementations, digital-processing blocks shown in FIG. 6 may employ a parallel implementation. For example, if a parallelism factor of 8 is used, the clock is reduced from 2592 MHz to 274 MHz.

While embodiments of the invention show a ratio of 3/2 between the OFDM sampling rate and the single-carrier chip rate, alternative embodiments may employ different ratios. Those alternative embodiments that perform transmit-side processing may configure the interpolation and decimation such that the ratio of the interpolation factor to the decimation factor equals the ratio between the OFDM sampling rate and the single-carrier chip rate.

Receiver processing may also employ interpolation and decimation. However, the receiver processing employs a ratio of the decimation factor to the interpolation factor equal to the ratio between the OFDM sampling rate and the single-carrier chip rate. For example, an interpolation factor of 2 and a decimation factor of 3 changes the received 2592 MHz signal to a 1728 MHz signal. Alternatively, the receiver may implement a polyphase filter with a rate-conversion factor of 2/3.

A group or network of devices having data connection among each other is sometimes referred to as a piconet, which is defined as a logical group of two or more devices communicating with each other. The IEEE 802.15.3 specification provides for a piconet consisting of a set of Devices (DEVs) and a PNC, which handles piconet coordination functions, such as association, channel time allocation, etc.

Figure 7A:
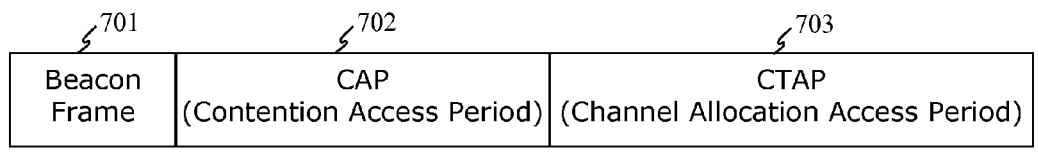
FIG. 7A shows a super frame used for Piconet timing in accordance with an embodiment of the invention.
Figure 7B:
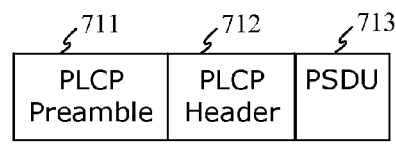
FIG. 7B depicts a beacon frame used as part of the super frame.

Piconet timing is facilitated by the PNC transmitting a super frame, such as shown in FIG. 7A, which comprises a beacon frame (BF) 701, a Contention Access Period (CAP) 702 based on a CSMA/CA protocol, and a Channel Time Allocation Period (CTAP) 703 based on a TDMA protocol. The CTAP 703 is used for Management Channel Time Allocation and regular Channel Time Allocations. The BF 701 comprises a physical layer convergence protocol (PLCP) preamble 711, a PLCP header 712, and a PLCP service data unit (PSDU) 713, such as shown in FIG. 7B.

PNCs and Devices may employ a variety of antennas and antenna configurations, including omni-directional antennas, sectored antennas, or phased antenna arrays employing beamforming. Phased antenna arrays may include one-dimensional arrays and two-dimensional arrays. Thus, a wide variety of devices with different antenna beam patterns and capabilities need to discover, associate, and track the PNC. Furthermore, the PNCs may employ a variety of antennas and antenna configurations.

Figure 8:
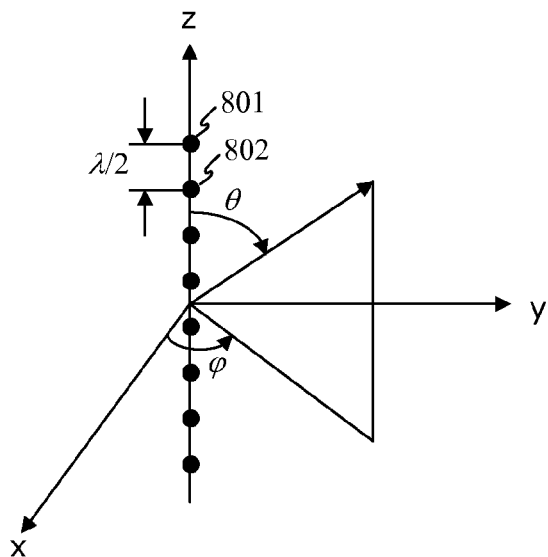
FIG. 8 shows a one-dimensional antenna array with 8 antenna elements spaced by a half wavelength ($\lambda/2$).
Figure 9:
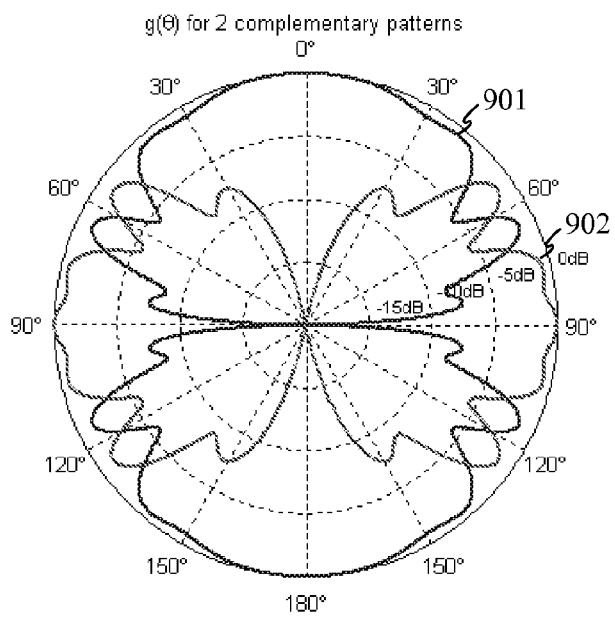
FIG. 9 is a plot of antenna array beam pattern intensity for a pair of complementary beam patterns in accordance with one aspect of the invention.

FIG. 8 shows a one-dimensional antenna array with 8 antenna elements (including antenna elements 801 and 802). Adjacent antenna elements are spaced by a half wavelength ($\lambda/2$). FIG. 9 is a plot of antenna-array beam-pattern intensity for a pair of complementary beam patterns 901 and 902 in accordance with one aspect of the invention. A first transmission pattern representing excitation weights [+1 +1 −1 −1 +1 −1 +1 −1] (which, in this case, means that the weight vector of in-phase values [+I +I −I −I +I −I +I −I]) is applied across the 8 antenna elements, is maximum in the direction 0° with a Half Power Beam Width (HPBW) of 98° and a maximum gain of 3 dB. This pattern is denoted as a main quasi-omni (Q-Omni) pattern. A second pattern generated from a set of weights [+1 −1 −1 +1 +1 +1 +1 +1] (which means that the weight vector of in-phase values [+I −I −I +I +I +I +I +I]) applied across the 8 antenna elements is maximum at 90° with a HPBW of 41° and a maximum gain of 3 dB. This pattern is denoted as a Complementary Q-Omni pattern. These two patterns are exactly complementary in the sense that the sum of their power gain is a constant=3 dB.

In one embodiment of the invention, a PNC is configured to transmit its first set of BF signals using a set of complementary patterns that together span the entire space (i.e. together provide omni-directional coverage). In some embodiments, omni-directional coverage may not be possible. Thus, the PNC may transmit BF signals in a set of substantially complementary patterns whose sum provides wider coverage (e.g., has a wider angle) than any individual pattern.

In one embodiment, the PNC first transmits a BF using a pattern that corresponds to the maximum HPBW, which is the Q-Omni pattern. If necessary, the PNC may transmit a second BF in a complementary pattern that has maximum gain where the Q-Omni pattern has minimum gain. This technique may be generalized to other embodiments, such as antenna arrays having more than two complementary patterns, including two-dimensional phased arrays. In another embodiment, a PNC employing sectored antennas provides omni-directional coverage by transmitting a BF in each sector. The set of BFs transmitted in these sectors together will provide omni-directional coverage.

Figure 10:
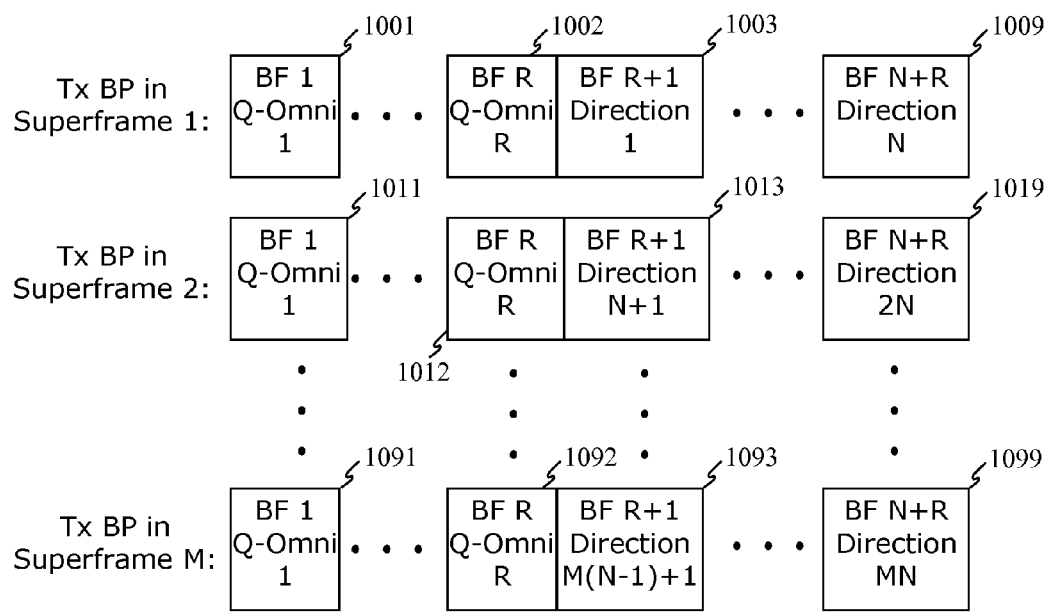
FIG. 10 shows a beacon frame transmitted by a PNC in accordance with an embodiment of the invention.

FIG. 10 is a flow diagram for frame transmission as configured in accordance with various embodiments of the invention. If the PNC is capable of transmitting a set of R complementary Q-Omni patterns, the first R BFs are transmitted with the corresponding Q-Omni patterns. The PNC transmits a plurality R of Q-Omni BFs for each of a plurality M of superframes. For example, R BFs 1001-1002 corresponding to R Q-Omni patterns are transmitted in the first superframe, and R BFs 1011-1012 corresponding to the R Q-Omni patterns are transmitted in the second superframe. This process is repeated for each of a plurality M of superframes such that R BFs 1091-1092 corresponding to the R Q-Omni patterns are transmitted in the $M^{th}$ superframe. Alternatively, a subset of the Q-Omni patterns may be transmitted.

The Q-Omni BFs may be transmitted using the CM, since the CM can be understood by all devices and every device is receptive to an omni pattern. Although not shown, the BFs may be separated by a guard time, such as may be used by the PNC to switch from one direction to another.

Figure 11:
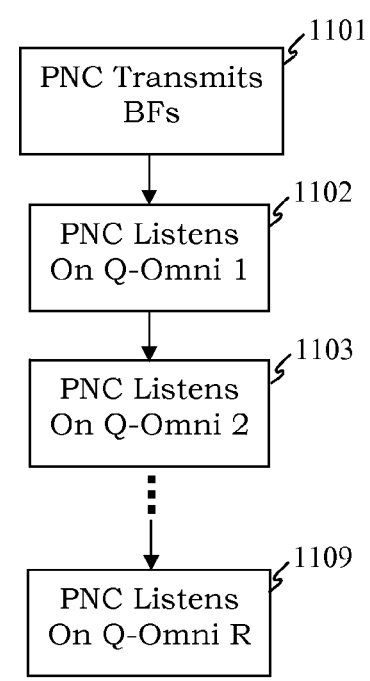
FIG. 11 is a flow diagram illustrating listening periods that follow a beacon frame transmission.

For each superframe, the PNC has R listening periods corresponding to the R transmitted Q-Omni BFs. FIG. 11 is a flow diagram illustrating how the PNC employs R listening periods 1102-1109 after it transmits the BFs 1101. Each listening period 1102-1109 is long enough to allow multiple devices to contend for access and report back their best found direction. These R listening periods can be part of the BP and/or part of the CAP. The start time, duration, and number R of listening periods may be transmitted by the PNC in each Q-Omni BF.

If the PNC is capable of transmitting in J=N×M directions, then J BFs may be transmitted over M superframes with N BFs per superframe. For example, N BFs 1003-1009 correspond to the first N directions. N BFs 1013-1019 correspond to the second N directions, and N BFs 1093-1099 correspond to the $M^{th}$ N directions. A direction, as used herein, is understood to mean a sector in the case of sectored antennas, a beam oriented with its maximum in a given direction ($\theta_0$) in the case of a one-dimensional array, and a beam oriented with its maximum in a given direction ($\theta_0$, $\phi_0$) in the case of a two-dimensional array. The definition of direction may be adapted as appropriate for different types of antennas and antenna configurations.

In the IEEE 802.15.3 and 3b specifications, the BF signals comprise a beacon frame number, a superframe duration, a CAP end time, and an indication of allowed operations in the CAP. In embodiments of the invention that employ sectored antennas, additional information in the BF may further include the total number of directions J, the number of superframes M, the number of directions transmitted in the current superframe N, the direction number of the first directional BF, r(N−1)+1, the duration of each directional BF (and structure, if necessary), and the number, duration, and start time of the listening periods. Embodiments that employ Q-Omni BFs may further provide for the number of Q-Omni BFs per superframe.

Since the directional patterns have greater antenna gain than the Q-Omni patterns, if the same BF duration is used for both, the directional BFs will have much greater range due to the higher antenna gain. Thus, some embodiments of the invention may provide the set of R complementary Q-Omni BFs with a higher spreading gain (longer duration) than the directional BFs. For example, a method embodiment of the invention provides for selecting a higher spreading gain of the Q-Omni BFs in order to compensate for the higher antenna gain of the directional BFs. This may be performed such that the total gain (resulting from combining the antenna gain and the spreading gain) of the Q-Omni BFs equals the total gain of the directional BFs. Increasing the spreading gain may be achieved by any combination of repetition, scrambling, and employing longer Golay codes.

Figure 12:
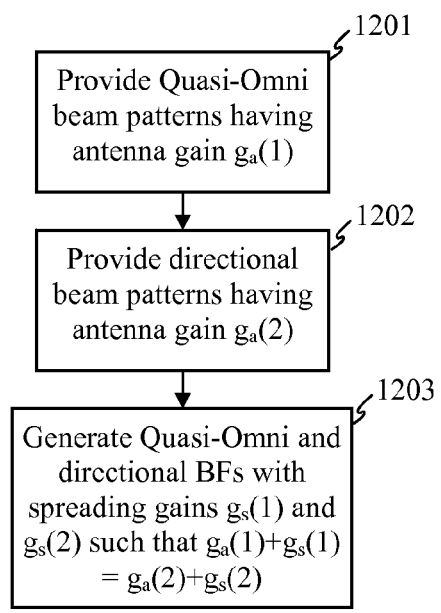
FIG. 12 is a flow diagram illustrating a method for selecting BF spreading gains to compensate for differing antenna gains.

FIG. 12 is a flow diagram illustrating a method for selecting BF spreading gains to compensate for differing antenna gains. An antenna array is configured to provide for a plurality of Quasi-Omni beam patterns 1201. In this case, each pattern has a first antenna gain of $g_a(1)$. The antenna array is further configured to provide for one or more directional beam patterns 1202, wherein each directional beam pattern has a second antenna gain of $g_a(2)$. In this case, the first antenna gain $g_a(1)$ differs from the second antenna gain $g_a(2)$. A BF for each Quasi-Omni pattern and each directional pattern is generated 1203, wherein the Quasi-Omni BF is provided with a spreading gain of $g_s(1)$, and the directional BF is provided with a spreading gain of $g_s(2)$. The spreading gains $g_s(1)$ and $g_s(2)$ are selected to compensate for the differences in the antenna gains $g_a(1)$ and $g_a(2)$. For example, the total gain, comprising spreading gain and antenna gain, for transmissions employing each beam pattern are made substantially equal.

Figure 13A:
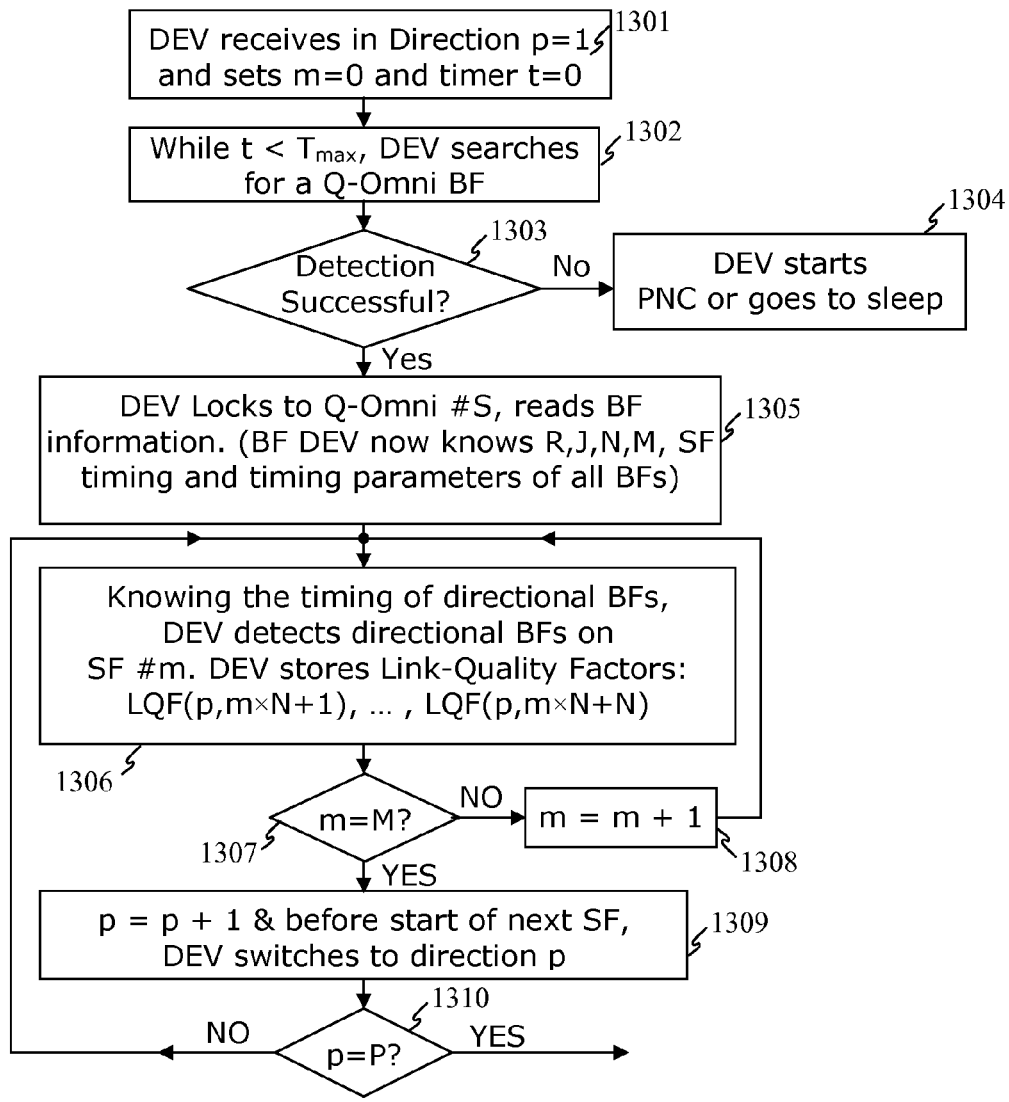
FIG. 13A is a flow diagram configured for enabling a PNC and subscriber devices to discover each other, associate, and perform tracking in accordance with one embodiment of the invention.

FIG. 13A is a flow diagram configured for enabling a PNC and subscriber devices to discover and associate with each other in accordance with one embodiment of the invention. A subscriber device (DEV) is assumed to be capable of transmitting and receiving in P directions (labeled p=1, p=2, . . . , p=P), whereas the PNC is assumed to be capable of transmitting and receiving in J=N×M directions (labeled j=1, j=2, . . . ,j=N×M, wherein n=1:N, m=1:M). A combination (p,j) refers to the DEV transmitting/receiving in direction p, and the PNC transmitting/receiving in direction j.

The DEV initializes its acquisition procedure 1301 with p=1, m=0, and its timer set to t=0. Within a predetermined amount of time, $T_{max}$, the DEV searches for a Quasi-Omni BF 1302 and determines whether successful detection 1303 has occurred. In the absence of successful detection 1303, the DEV may direct the PNC to change its beamforming, or the DEV may go into sleep mode 1304. Upon successful detection, the DEV locks onto the corresponding Quasi-Omni signal and reads the BF information 1305. The DEV uses the known timing information of the directional BFs to detect the directional BFs associated with the current direction variable m and store associated link quality factors (LQFs) 1306. The variable m is incremented 1308 and the step 1306 is repeated until all M directions are processed 1307. The DEV direction variable p is incremented and the DEV selects the direction corresponding to p 1309. For p<P 1310, the steps 1306, 1307, 1308, and 1309 are repeated.

Figure 13B:
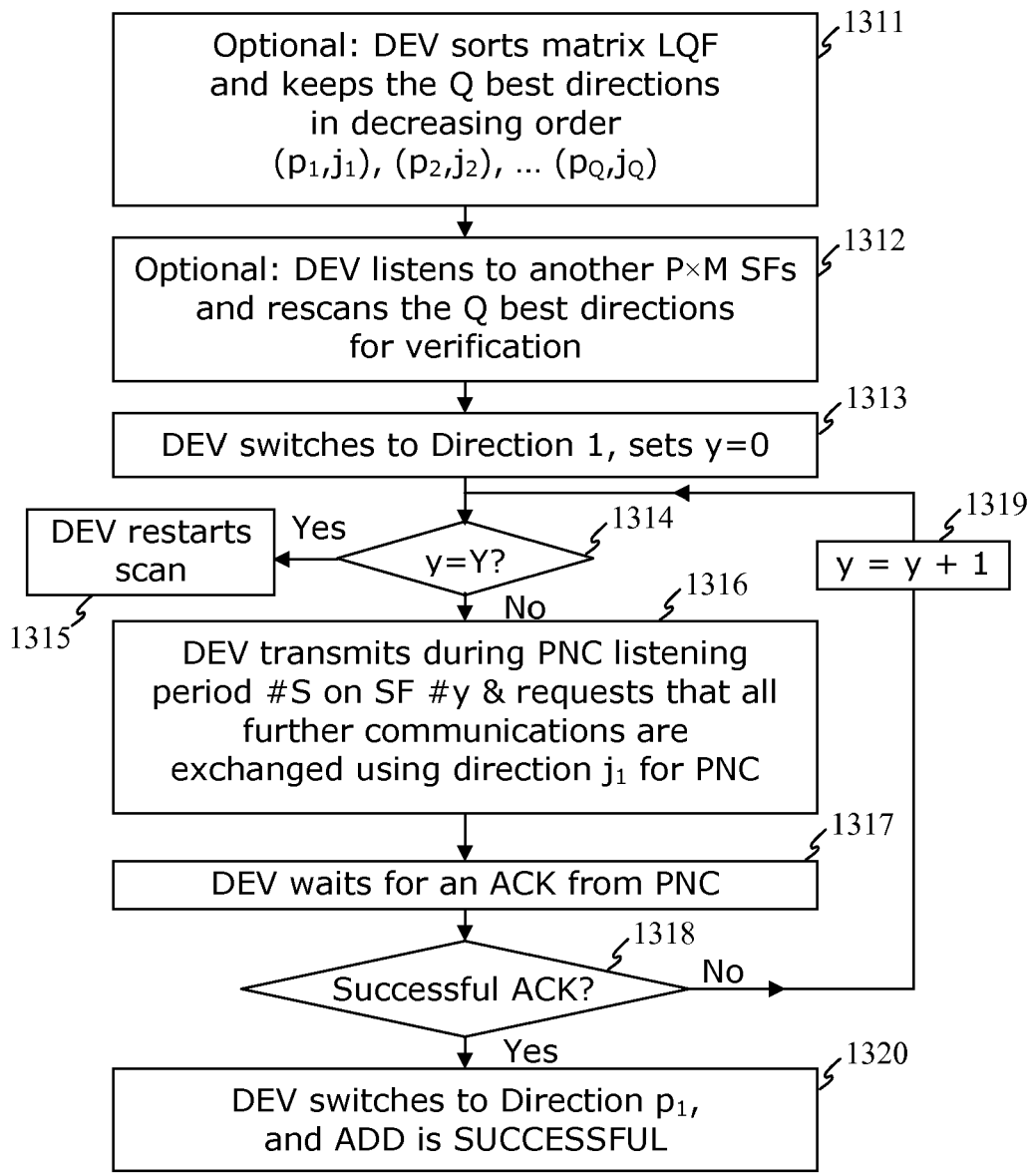
FIG. 13B illustrates an acquisition and tracking method in accordance with an embodiment of the present invention.

FIG. 13B illustrates an acquisition and tracking method in accordance with an embodiment of the present invention. In some embodiments, the method shown in FIG. 13B may be a continuation of the method shown in FIG. 13A. The DEV may sort a matrix of LQFs and keeps a predetermined number Q of best directions 1311. When a device discovers an optimal combination ($p_1$,$j_1$) corresponding to the PNC using direction $j_1$ and the DEV using direction $p_1$, it is desirable that all further communications be assigned to this combination. The DEV may listen to another P×M superframes and rescan the Q best directions 1312. The DEV switches to the best of the Q directions and initializes a superframe index, y=0 1313.

For each superframe index y, up to a predetermined maximum value Y, the following loop is performed. The DEV transmits a request during a PNC listening period S on superframe y 1316. The request notifies the PNC to use preferred direction $j_1$ for further communications with the DEV. The DEV waits for an acknowledgement (ACK) from the PNC 1317. If the ACK is successful 1318, the DEV switches to its preferred direction $p_1$, resulting in a successful completion of automatic device detection (ADD) 1320. If the ACK is not successful 1318, index y is incremented, and control returns to step 1314, which determines if index y is equal to its predetermined maximum value Y. If y=Y, the DEV restarts its scanning procedure 1315.

The DEV may track the best Q directions on a regular basis, i.e. listen to these directions periodically or continuously. The device may continuously or periodically update the list LQF ($p_1$,$j_1$), . . . , LQF($p_Q$,$j_Q$). If the link quality of the current combination ($p_1$,$j_1$) drops below a predetermined threshold, and another candidate combination ($p_i$,$j_i$) is discovered to be preferable, the device may request that the PNC switch to the new combination ($p_i$,$j_i$). The device may even choose to track all directions periodically or continuously, and choose the appropriate action upon sorting the LQF matrix.

The invention is not intended to be limited to the preferred embodiments. Furthermore, those skilled in the art should recognize that the method and apparatus embodiments described herein may be implemented in a variety of ways, including implementations in hardware, software, firmware, or various combinations thereof. Examples of such hardware may include ASICs, Field Programmable Gate Arrays, general-purpose processors, DSPs, and/or other circuitry. Software and/or firmware implementations of the invention may be implemented via any combination of programming languages, including Java, C, C++, Matlab™, Verilog, VHDL, and/or processor specific machine and assembly languages.

Computer programs (i.e., software and/or firmware) implementing the method of this invention may be distributed to users on a distribution medium, such as a SIM card, a USB memory interface, or other computer-readable memory adapted for interfacing with a wireless terminal. Similarly, computer programs may be distributed to users via wired or wireless network interfaces. From there, they will often be copied to a hard disk or a similar intermediate storage medium. When the programs are to be run, they may be loaded either from their distribution medium or their intermediate storage medium into the execution memory of a wireless terminal, configuring an onboard digital computer system (e.g. a microprocessor) to act in accordance with the method of this invention. All these operations are well known to those skilled in the art of computer systems.

Various digital computer system configurations can be employed to perform the method embodiments of this invention, and to the extent that a particular system configuration is capable of performing the method embodiments of this invention, it is equivalent to the representative system embodiments of the invention disclosed herein, and within the scope and spirit of this invention.

Once digital computer systems are programmed to perform particular functions pursuant to instructions from program software that implements the method embodiments of this invention, such digital computer systems in effect become special-purpose computers particular to the method embodiments of this invention. The techniques necessary for this programming are well known to those skilled in the art of computer systems.

Various embodiments of the invention may include variations in system configurations and the order of steps in which methods are provided. In many cases, multiple steps and/or multiple components may be consolidated.

The method and system embodiments described herein merely illustrate particular embodiments of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying principles of the invention. Similarly, it should be appreciated that any flow charts, flow diagrams, signal diagrams, system diagrams, codes, and the like represent various processes that may be substantially represented in computer-readable medium and so executed by a computer or processor, whether or not such computer or processor is explicitly shown.

The functions of the various elements shown in the drawings, including functional blocks labeled as "processors" or "systems," may be provided through the use of dedicated hardware as well as hardware capable of executing software in association with appropriate software. When provided by a processor, the functions may be provided by a single dedicated processor, by a shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

Any element expressed herein as a means for performing a specified function is intended to encompass any way of performing that function including, for example, a combination of circuit elements which performs that function, or software in any form, including, therefore, firmware, micro-code or the like, combined with appropriate circuitry for executing that software to perform the function. Embodiments of the invention as described herein reside in the fact that the functionalities provided by the various recited means are combined and brought together in the manner which the operational descriptions call for. Applicant regards any means that can provide those functionalities as equivalent to those shown herein.

The invention claimed is:

1. An apparatus, comprising:
   a $\pi/2$ continuous rotator configured to rotate an input data signal by $j^k$, where j denotes the complex value, $\sqrt{-1}$, and k denotes a symbol index of the input data signal and to output the rotated data signal as a complex signal comprising real and imaginary binary parts, and
   in-phase and quadrature-phase analog Bessel filters configured for operating on the complex signal to produce a constant-amplitude output signal.

2. An apparatus, comprising:
   a $\pi/4$ fixed rotator and a $\pi/2$ continuous rotator configured to process an input data signal to produce a complex signal comprising real and imaginary binary parts, wherein the complex signal is in a form expressed by $a_k = d_k \times (1+j) \times j^k$, where $d_k$ is a $k^{th}$ data symbol of the input data signal, and j denotes the complex value, $\sqrt{-1}$, and
   in-phase and quadrature-phase analog Bessel filters configured for operating on the complex signal to produce a constant-amplitude output signal.

3. The apparatus recited in claim 1, wherein the in-phase and quadrature-phase analog Bessel filters are configured to produce the complex signal such that it is characterized by an approximation to linearized GMSK pulses.

4. An apparatus comprising:
   a $\pi/4$ fixed rotator and a $\pi/2$ continuous rotator configured to process an input data signal to produce a complex signal comprising real and imaginary binary parts, and
   in-phase and quadrature-phase analog Bessel filters configured for operating on the complex signal to produce a constant-amplitude output signal.

5. An apparatus, comprising:
   a modulator, the modulator comprising:
      a $\pi/2$ continuous rotator configured to process an input data signal to produce a complex signal comprising real and imaginary binary parts, and
      in-phase and quadrature-phase analog Bessel filters configured for operating on the complex signal to produce a constant-amplitude output signal, and
   a demodulator, the demodulator comprising:
      a down-converter configured for down-converting a received signal to an intermediate-frequency (IF) signal, a band-pass limiter configured for processing the IF signal, and a demultiplexer.

6. The apparatus recited in claim 5, wherein the downconverter comprises a single mixer.

7. The apparatus recited in claim 5, further comprising a 1-bit sampler driven at a plurality of phases of a clock implemented with a ring oscillator.

8. A multi-mode transmitter configured to support a multicarrier signal and a single-carrier signal, the multicarrier signal having a sampling rate that differs from a chip rate of the single carrier-signal, the transmitter comprising:

an interpolator configured for interpolating a data stream with respect to a predetermined factor N to generated interpolated data, a $\pi/2$ continuous rotator and a pulse-shaping filter configured for producing a constant-envelope modulated signal from the interpolated data, and a decimator configured for decimating the modulated signal by a factor of M for producing a decimated waveform having a sampling rate of N/M.

9. The transmitter recited in claim 8, wherein the interpolator, the $\pi/2$ continuous rotator, and the pulse-shaping filter are implemented with a polyphase filter.

10. The transmitter recited in claim 8, wherein each of the interpolator, the $\pi/2$ continuous rotator, the pulse-shaping filter, and the decimator are configured to employ a parallel implementation.

11. The transmitter recited in claim 8, further comprising a receiver, the receiver comprising an interpolator and a decimator configured to adjust the rate of the received signal by a ratio M/N.

12. A method for modulating an input data signal, comprising:

rotating the input data signal by $j^k$, where j denotes the complex value, $\sqrt{-1}$, and k denotes a symbol index of the input data signal, outputting the rotated data signal as a complex signal comprising real and imaginary binary parts, and processing the real and imaginary binary parts of the complex signal to produce a constant-amplitude output signal.

13. An apparatus for modulating an input data signal, comprising:

means for rotating the input data signal by $j^k$, where j denotes the complex value, $\sqrt{-1}$, and k denotes a symbol index of the input data signal, means for outputting the rotated data signal as a complex signal comprising real and imaginary binary parts, and means for processing the real and imaginary binary parts of the complex signal to produce a constant-amplitude output signal.

14. A computer-readable storage medium encoded with instructions executable by at least one computer for performing a method, the method comprising:

rotating an input data signal by $j^k$, where j denotes the complex value, $\sqrt{-1}$, and k denotes a symbol index of the input data signal, outputting the rotated data signal as a complex signal comprising real and imaginary binary parts, and processing the real and imaginary binary parts of the complex signal to produce a constant-amplitude output signal.

15. A method for supporting a multicarrier signal and a single-carrier signal, the multicarrier signal having a sampling rate that differs from a chip rate of the single carrier-signal, comprising:

interpolating a data stream with respect to a predetermined factor N to generated interpolated data, processing the interpolated data to produce a constant-envelope modulated signal, and decimating the modulated signal by a factor of M for producing a decimated waveform having a sampling rate of N/M.

16. An apparatus supporting a multicarrier signal and a single-carrier signal, the multicarrier signal having a sampling rate that differs from a chip rate of the single carrier-signal, comprising:

means for interpolating a data stream with respect to a predetermined factor N to generated interpolated data, means for processing the interpolated data to produce a constant-envelope modulated signal, and means for decimating the modulated signal by a factor of M for producing a decimated waveform having a sampling rate of N/M.

17. A computer-readable storage medium encoded with instructions executable by at least one computer for performing a method, the method comprising:

interpolating a data stream with respect to a predetermined factor N to generated interpolated data, processing the interpolated data to produce a constant-envelope modulated signal, and decimating the modulated signal by a factor of M for producing a decimated waveform having a sampling rate of N/M.

* * * * *